Patented July 15, 1952

2,603,624

UNITED STATES PATENT OFFICE 2,603,624

CONDENSATION PRODUCTS FROM AN AMINOTRIAZINE AND TRIMETHYLOL-ACETALDEHYDE

Karl Keller and Otto Hansen, Frankfort-on-the-Main-Fechenheim, Germany, assignors to Cassella Farbwerke Mainkur, Frankfort-on-the-Main-Fechenheim, Germany No Drawing. Application December 27, 1950, Serial No. 203,009. In Germany January 19, 1950

3 Claims. (Cl. 260—67.6)

This invention relates to new condensation products.

It is already known that urea or heterocyclic amines can be condensed with aldehydes especially formaldehyde. These condensation products are already used in a large scale in many branches of industry f. i. the industry of textiles, paper, lacquers, pressed or cast masses.

The object of the present invention is to provide a new kind of condensation products. These new products contain as the aldehyde component an aliphatic aldehyde containing methylol groups. The presence of these methylol groups produces new properties of the condensation products containing such aldehydes, especially a higher solubility in water of the primary condensation products and a relatively high elasticity of the final condensation products in comparison to formaldehyde condensation products of the same degree of condensation. Furthermore these condensation products show the advantage that they give off scarcely any formaldehyde. According to these properties their application in the industry produces new effects: When applied in the textile industry the textile materials treated therewith exhibit a remarkable crease resistance; papers treated therewith are very pliable; lacquers are distinguished by their high elasticity; casting resins prepared therefrom show a low degree of inner tension occurring during the casting process.

As aldehyde components used in preparing the new condensation products may be named: trimethylolacetaldehyde, dimethylolpropionaldehyde, methylolisobutyraldehyde. Suitable amine components are: urea, thiourea, dicyandiamide, guanidine, aminotriazines, and their substitution products, aminodiazines, amino-quinazolines, guanazoles and so on.

The condensation may be carried out with different molecular proportions of the components, advantageously in the presence of water. The pH value during the reaction may be above 8. In this manner addition compounds soluble in water are obtained forming more or less distinct crystals. The stability of the products may further be enhanced by the addition of small amounts of organic bases during or after the condensation. By further heating or by a variation of the pH value to below 7 the condensation may be effected until the formation of products of limited solubility in water. This step of condensation may be maintained by cooling or by a change of the pH value to above 8. When these products more or less soluble in water are etherified by means of monovalent or polyvalent alcohols, other resins are obtained which are mostly insoluble in water but soluble in many organic solvents. To these compounds polyester resins especially alkydales may be co-condensed before removing the whole amount of the condensation water.

The manufacture of these condensation products may be varied by an election of the starting materials, the reaction conditions, and by other additional agents in order to make the final products suitable for the intended purposes of use. According to the properties of the condensation products they may be used f. i. for the following purposes:

The solutions of the condensation products easily soluble in water are suitable to make textile fabrics crease-resistant or to improve the wet strength, f. i. by impregnating viscose rayon fabrics with solutions of the new condensation products with the addition of limited amounts of organic acids. The products of a small degree of solubility in water and the products insoluble in water and therefore applicable in the form of emulsions may be used f. i. for the manufacture of water proof papers. Thereby a prematuration of the preparations is not necessary. Thus the use of these condensation products is clearly distinguished from the known methods, because according to the latter methods melamine formaldehyde condensation products are suitable for the said purpose only after converting their aqueous solutions into a higher degree of condensation by the addition of large amounts of strong acids. The fact that in such a case large amounts of acids are to be added is known to be undesirable for the paper maker. In contradistinction hereto the new process using the condensation products of this invention is much simpler. It shows the following advantage: good solubility of the used products without the need of a special heating; avoiding the addition of an acid and troubles because of bad smell; use of the solutions immediately after the dilution of the products, no further heating operation for the ready made paper.

The products insoluble in water and therefore useful in the form of emulsions may be used as stoving lacquers which form when heated to about 120° white films of a good elasticity and a high brilliancy. The co-condensation products of the partially etherified condensation products and polyester resins may be also used as lacquer resins. Furthermore these products may be used as casting resins and yield when used as such milkwhite or colorless transparent masses of a strong refraction of light, showing a good hardness and stability and no cracks when stored for a longer time.

The following examples illustrate the invention but are not intended to limit it thereto; the parts are given by weight and all temperatures in centigrade degrees.

*Example 1*

63 parts of melamine are mixed with 160 parts of a concentrated 83.5% solution of trimethylolacetaldehyde (prepared from acetaldehyde and formaldehyde with sodium carbonate as a catalyst) with the addition of 80 parts of water. Then caustic soda solution is added until the mixture shows an alkaline reaction. The mass is stirred and heated gradually to 80°. During this operation the alkalinity is maintained if necessary during the process by means of small amounts of concentrated sodium carbonate solution. The solution thus obtained is instantly cooled. Thereby 305 parts of a viscous solution are obtained which become pasty when thereafter cooled or by standing for several hours or solidified in a form of a paste of fine crystals. The product contains about 64.5% of an addition product of 2 moles trimethylolacetaldehyde and 1 mole melamine. It is clearly soluble in small amounts of warm water. The concentrated solution may be diluted further by means of cold water. A product still better storable but otherwise showing nearly the same qualities is obtained when in the foregoing mixture 14 parts of triethanolamine are added before heating to 80°. A further addition of the sodium carbonate during the heating is no longer necessary in this case.

30 parts of the product thus obtained corresponding to about 18.5 parts of a 100% product which may or may not contain ethanolamine, are dissolved in 30–50 parts of warm water at a temperature of about 40°. This solution is made up by means of water to 1 ltr. Viscose rayon fabric is impregnated with this solution for several minutes, squeezed and dried. After 10 minutes heating 110° the fabric shows a remarkable rise of the crease resistance when compared with the untreated fabric; a further rise is observed by heating to 130° for 10 minutes.

When 4 ccm. per liter of a 35.7% glycolic acid are added to the impregnating solution before treating the fabric with it, a fabric is obtained which shows besides an improvement of the crease resistance a rise of the wet strength.

An about 52% solution of mono-($\beta$-trihydroxymethyl-$\alpha$-hydroxyethyl)-melamine (prepared from 1 mole melamine and 1 mole trimethylolacetaldehyde) produces on the same rayon fabric a rise of the crease resistance already by afterheating the fabric to 110°. The compound prepared from 1 mole melamine and 6 moles trimethylolacetaldehyde is obtained partially as star-like crystal needles. The N-content of the dried crystallized product is 9.23% whereas the theoretical N-content of hexa-($\beta$-trihydroxymethyl-$\alpha$-hydroxy-ethyl)-melamine is 9.03%.

When 30 g. per liter of the 68% solution of this product (corresponding to 20.4 g. of the water free product) is applied onto the fabric without the addition of an acid catalyst a similar effect is produced by 10 minutes' afterheating of the fabric to 110 or 130°.

By means of 31 g. per liter of a 77% solution of a condensation product of lower molecular weight which is prepared in an analogous way by starting from 1 mole urea and 1 mole trimethylolacetaldehyde a remarkable crease resistance is produced. By treating the fabric in this solution containing furthermore 4 g. per liter of glycolic acid an improvement of the wet strength is simultaneously produced.

By a subsequent addition of small amounts of organic bases (f. i. pyridine, piperidine, ethanolamines and so on) to the newly prepared concentrated solutions of the products herein described, more stable products are obtained.

*Example 2*

62.6 parts of acetoguanamine are mixed with 304.6 parts of a 88% solution of trimethylolacetaldehyde and 75 parts of water. The mixture is rendered weakly alkaline by means of caustic soda solution and it is heated while stirring to 70°. The clear solution thus formed is further heated for 1 hour to 80°. During this process the alkalinity is maintained by the addition of sodium carbonate solution. After cooling 449 parts of a viscous clear solution of 73.6% of the condensation product of 1 mole acetoguanamine and 4 moles trimethylolacetaldehyde is obtained. The viscous solution of this compound is clear dilutable with any amount of water. By standing for a longer time this solution is transformed into a paste of crystal agglomerated. In this state the product when dissolved in about the same quantity of luke warm water is likewise dilutable with any amount of cold water. The product represents probably a mixture of the monomolecular compound and an intramolecularly etherified compound.

184 g. per liter of this product (corresponding to 135 g. of a 100% product) are dissolved in 1 liter of water at room temperature. After the addition of 8.5 g. of formic acid a rayon fabric is impregnated for a short time in this solution, advantageously at 30–40°, then squeezed, dried at 70–80° and after-condensed for 10 minutes at 113°. In this way a fabric is obtained which shows a remarkable crease resistance and stability in the wet and dry state.

*Example 3*

315 parts of melamine are dissolved in a mixture of 440 parts of water and 1165 parts of 86.3% trimethylolacetaldehyde by stirring and heating to 75°. The solution is made up to a pH value of 8–9 by means of caustic soda solution and maintained at a temperature of 80° for 30–40 minutes until a test becomes opaque when diluted with water. During this time the pH value is maintained at about 8.5 by the addition of concentrated sodium carbonate solution. Then the mass is instantly cooled to room temperature. In this way about 1930 parts of a viscous clear solution containing about 68% of the condensation product of 1 mole melamine and 3 moles trimethylolacetaldehyde are obtained.

5 parts of the product thus prepared are dissolved in 65 parts of ethylalcohol (denaturated by means of toluene). The solution is diluted by means of water (about 3 parts) until a clear opalescence occurs. The colloidal solution thus obtained is added to a paper pulp consisting of 100 parts of bleached sulfite cellulose of a high degree of hydration. When the mass is well mixed 2.5 parts of aluminium sulfate are added. This paper mass is made into a paper of 60 g. per square meter weight.

The paper thus prepared is distinguished by a high degree of wet strength without needing any separate aftertreatment at elevated temperature. When it is further treated with a small amount of resin glue (1% calculated for colophonium is sufficient) a good sizing effect is obtained besides the said improvement of the wet strength.

*Example 4*

63 parts of melamine are mixed with 140 parts of water and 401 parts of a concentrated solution (83.5%) of trimethylolacetaldehyde. The neutral mixture is heated to 70° as fast as possible without an addition of alkali, whereby dissolution occurs. Then a solution of caustic soda and finally a concentrated sodium carbonate solution are added, so that the solution clearly shows an alkaline reaction. Thereupon a temperature of 80° is maintained for about 30 minutes, whereafter it is immediately cooled down. About 600 parts are obtained of a solution which is viscous at room temperature and shows a somewhat higher degree of viscosity and a slight opalescence after standing some time; the solution contains about 65% of the condensation product thus formed.

When paper is treated with this product in a process as outlined in Example 3, a paper of improved wet-strength is obtained.

*Example 5*

84 parts of dicyandiamide and 223 parts of 86.3% trimethylol-acetaldehyde are dissolved at 70-80° by adding 70 parts of water. This solution is then condensed during 1½ hours at about 95°, a slight alkalinity being maintained by adding small amounts of sodium carbonate solution. Thereupon about 70 parts of water are distilled off during about 50 minutes at 95°, on stirring in an air-stream. Then distilling is discontinued but stirring is continued at 95° until a test made with a small part of the viscous product obtained shows turbidity when diluted with more than 3 parts of water. About 317 parts of a highly viscous condensation product are obtained, containing 1 mole dicyandiamide and 1½ moles trimethylolacetaldehyde.

With this product a paper of high wet strength can be produced in a similar manner as indicated in Example 3, when 4-5 parts of the product, dissolved in water, are added to a paper pulp of 100 parts of cellulose. The application of this condensation product offers the advantage that it may be embodied into the paper pulp when dissolved in water only, without necessitating the use of alcohol.

*Example 6*

315 parts of melamine are stirred with 2310 parts of 86.5% trimethylolacetaldehyde and 800 parts of water. Then, after rendering the mixture slightly alkaline, 3400 parts of butanol are added. The distillation receiver is filled with toluene, heating is started, and the mixture is distilled azeotropically until about 700 parts of water are distilled off. The butanol-toluene-mixture is returned to the reaction receptacle.

Then 10 parts of phthalic anhydride, dissolved in some butanol, are added. Azeotropical distillation is continued until a total of about 1400 parts of the aqueous solution is distilled off. The duration of the distillation is in total 4 hours, during which the inner temperature of the lacquer-solutions rises to about 118°. About 5350 parts of raw lacquer are obtained from which impurities (f. i. small amounts of salt set free, originating from the trimethylolacetaldehyde-product) are filtered off. The pure lacquer obtained is made up to a content of 50% lacquer resin. 5400 parts are obtained of the 50% solution of lacquer resin.

The solution of lacquer resin thus produced forms—without addition of an alkyd resin already—a white film having a very good elasticity as well as good hardness when stoved at 120°. In case before spraying there is mixed to the lacquer besides a pigment an alkyd resin (f. i. the one known on the market as Alkydal RD 18 or Alkydal T) at the rate of 3:7, films are obtained from this mixture which, stoved at 120°, are of an extremely improved elasticity and of very good hardness. Even when stoved at 180° this elasticity is impaired little, while a higher degree of hardness is obtained.

In case the condensation as described above is performed with about 1 part of 10 n-hydrochloric acid instead of using the phthalic acid catalyst (condensation temperature rising up to 120° and a little more of condensation water distilling off) a lacquer resin is obtained which, when mixed with an alkyd resin, produces films of a good elasticity and high brilliancy.

In case the etherification is performed with benzyl alcohol instead of n-butanol with a temperature-limit at 170° on condensation, a lacquer resin is produced from which (even without an incorporation of an alkyd resin; stoved at 120°) films with an exceedingly high brilliancy and very good elasticity are obtained. When condensing up to a temperature of 141° only, the lacquer resin obtained (especially in mixture with a modified alkyd resin prepared from phthalic anhydride, glycerol and linseed oil) results in films which, when stoved at 120° as well as at 180°, possess a very good brilliancy and a very high degree of elasticity, when stoved at 180° also a very good hardness is obtained.

*Example 7*

31.5 parts of melamine are dissolved in a solution of 192.5 parts of 86.5% trimethylolacetaldehyde in 80 parts of water by heating to 80°. Then 444 parts of butanol are added. This mixture undergoes an azeotropical distillation until 65 parts of water are distilled off. 1 part of phthalic anhydride is added and—while stirring at the same time—distillation is continued until 120 parts of water are distilled off. Thereupon are added 148 parts of a solution (containing 37.2% cyclohexanone and butanol) of a polyester prepared from 3 molecular proportions of pentaerythrite and 4 molecular proportions of adipic acid (polyesterified finally in presence of cyclohexanone and butanol up to an acid number of 134). The cocondensation is executed on distilling further azeotropically until an inner temperature of 117° is reached and a total of 148 parts of water is distilled off. About 530 parts of a 50% solution of the mixed condensation product are obtained. This lacquer resin produces, when stoved at 120°, white films of a medium silky brilliancy, having good hardness and outstanding elasticity.

We claim:

1. As new compounds the condensation products of melamine and trimethylolacetaldehyde among which compounds the representatives of a lower degree of condensation show a high solubility in water and the representatives of a higher degree of condensation a high elasticity.

2. As new compounds the condensation products of an aminotriazine and trimethylolacetaldehyde among which compounds the representatives of a lower degree of condensation show a high solubility in water and the representatives of a higher degree of condensation a high elasticity.

3. Process which comprises condensing an aminotriazine with trimethylolacetaldehyde in the presence of an alkali and of water.

KARL KELLER.
OTTO HANSEN.

REFERENCES CITED

The following references are of record in the file of this patent:

UNITED STATES PATENTS

| Number | Name | Date |
|---|---|---|
| 2,197,357 | Widmer | Apr. 16, 1940 |
| 2,320,820 | D'Alelio | June 1, 1943 |
| 2,369,948 | D'Alelio | Feb. 20, 1945 |